2,813,092
OXYALKYLENE HEXITYL AMINE CONDENSATES

John D. Zech, Wilmington, Del., assignor to Atlas Powder Company, Wilmington, Del., a corporation of Delaware No Drawing. Application March 22, 1954,
Serial No. 417,914

5 Claims. (Cl. 260—211)

The present invention relates to new and useful chemical compounds that are oxyalkylene hexityl amine condensates. It is an object of the present invention to provide a method for preparing these oxyalkylene hexityl amine condensates. It is a further object of the invention to provide new chemical compounds that are useful as surface active agents, textile softeners, emulsifiers, textile lubricants, corrosion inhibitors, lubricant additives, petroleum additives, chemical intermediates, waxes and modifiers for polyester resins, polyurethanes, plasticizers, adhesives, coatings, films, fibers and the like. Further objects and advantages will become obvious to those skilled in the art from the following disclosure.

The compounds of the present invention may be represented by the following generic formula:

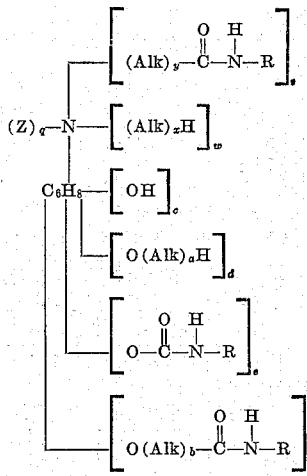

wherein: Z is a radical selected from the group consisting of alkyls containing 1 to 20 carbon atoms, aryl, aralkyl wherein the alkyl radical contains 1 to 10 carbon atoms and hydroxy alkyl containing 1 to 10 carbon atoms.

R is a radical selected from the group consisting of alkyl containing 1 to 20 carbon atoms, aryl and cycloalkyl containing 6 to 10 carbon atoms.

Alk is an oxyalkylene radical derived from an alkylene oxide.

$q$ is 0 to 2
$x$ is 1 to 100
$y$ is 1 to 100
$a$ is 0 to 100
$b$ is 0 to 100
$w$ is 0 to 2
$v$ is 0 to 2
$q+v+w=2$ $c$ is 0 to 5
$d$ is 0 to 5
$e$ is 0 to 5
$f$ is 0 to 5
$c+d+e+f$ is 5
$yv+xw+ad+fb$ is 1 to 100
$v+e+f$ is 1 to 3

The compounds of the present invention are prepared by reacting an oxyalkylene derivative of a hexityl amine with an isocyanate under conditions, hereinafter given. A hexityl amine is an amino derivative of a hexitol, such as sorbitol, mannitol, dulcitol, etc., wherein any one of the hydroxyl groups of the hexitol has been replaced by an amino group. Such hexityl amines are conveniently prepared by the catalytic hydrogenation of a hexose in the presence of ammonia or a primary or secondary amine. Suitable such hexityl amines, include, but are not limited to, glucamine; N-methyl, N-ethyl, N-propyl, N-butyl, N-benzyl, N-phenyl, N,N-diethyl, N,N-dibutyl, N,N-dimethyl, N-lauryl, N-cetyl, N-octadecyl, N-octadecenyl, N-allyl, N-methyl N-benzyl, N-hydroxyethyl, N-methyl N-hydroxyethyl, N-methyl N-cetyl, glucamine; fructamine; N-methyl, N-ethyl, N-propyl, etc. fructamine; The oxyalkylene hexityl amines are prepared by the reaction of an alkylene oxide with a hexityl amine at temperatures from about 75 to 150° C. and at pressures from atmospheric to about 100 p. s. i. in the presence or absence of basic catalysts such as sodium alkoxides, sodium hydroxide, sodium acetate, etc. Suitable alkylene oxides include, but are not limited to, ethylene oxide, proylene oxide, butylene oxide, glycidol, butadiene monoxide, butadiene dioxide, phenyl glycidyl ether, lauryl glycidyl ether, octadecyl glycidyl ether, octadecenyl glycidyl ether, di-glycidyl ether, etc. The oxyalkylene derivatives so formed must be free of amino hydrogen. Thus when glucamine or fructamine is used as initial reactant at least two moles of alkylene oxide must be used to react with the two amino hydrogens present. In the case of the alkylene oxides, listed above, for the purpose of this invention, from 1 to 100 moles of same may be reacted with a hexityl amine to form the oxyalkylene hexityl amine. The preferred range is from 1 to 30 moles of alkylene oxide per mole of mono-substituted glucamine. If a di-epoxide is used, the preferred range is ½ mole to 1 mole of di-epoxide per mole of hexityl amine. Di-epoxides may be used in conjunction with monoepoxides to form suitable oxyalkylene derivatives of hexityl amines. Mixtures of two or more monoepoxides or monoepoxides and di-epoxides may also be used. The oxyalkylene derivatives of hexityl amines may now be reacted with from 1 to 3 moles of an isocyanate to form a condensate that corresponds to the generic formula given above. Suitable isocyanates include, but are not limited to, such as ethyl, butyl, cyclohexyl, benzyl, phenyl, naphthyl, octyl, lauryl, cetyl, octadecyl, octadecenyl, etc., isocyanates. Preferred among the isocyanates are octadecyl, phenyl, ethyl, cetyl and octadecenyl isocyanates. As a class, those organic isocyanates are desired that contain no more than 20 carbon atoms. This includes alkyl, aryl, aralkyl, alkaryl and alicyclic isocyanates.

The condensation of an oxyalkylene derivative of a hexityl amine, and an isocyanate is preferably carried out at temperatures of about 75° to 175° C. But higher or lower temperatures may be used. When the oxyalkylene derivative of the hexityl amine contains from 1 to about 3 moles of alkylene oxide per mole of hexityl amine, it is sometimes necessary to keep the condensation reaction temperature below 160° C. to prevent anhydridization from occurring within the hexityl radical. The condensation reaction may also be conveniently carried out in the presence of inert solvents or diluents.

The products of the present invention may be further modified by esterification. Since they are tertiary amines they may be combined with mineral or organic acids to form amine salts or soaps. They may also be quaternized with the usual quaternizing agents to form quaternary ammonium salts.

The following examples are given by way of illustration and are not intended to limit the invention in any way.

Example I 164 gms. of N-methyl N-hydroxyethyl glucamine was heated to 108° C. and 209 gms. of octadecyl isocyanate was added dropwise with agitation at 108 to 124° C. during 12 minutes. The reaction mixture was heated at 124° C. to 135° C. for another 47 minutes to complete the reaction. On cooling, the product solidified. It was waxy in character and but slightly water soluble. It was readily dispersible in hot dilute aqueous acids such as acetic or hydrochloric acid and had a hydroxyl number of 399.

It can be seen that the product of this example readily conforms to the generic formula previously given in that Z is a methyl radical
R is an octadecyl radical
Alk, the oxyalkylene radical, is the oxyethylene radical

| | |
|---|---|
| $q$ is 1 | $c=4$ to 5 |
| $x=1$ | $d=0$ |
| $y$ is 1 | $e=0$ to 1 |
| $a$ is 0 | $f=0$ |
| $b$ is 0 | $c+d+e+f=5$ |
| $w$ is 0 to 1 | $yv+xw+ad+fb=1$ |
| $v$ is 0 to 1 | $v+e+f=1$ |
| $q+v+w=2$ | |

*Example II*

376 gms. of a polyoxyethylene derivative of N-methyl glucamine, containing an average of 6 oxyethylene groups per mole of methyl glucamine, was heated at 95° C. and 250 gms. of octadecyl isocyanate was added with stirring at 95° to 98° C. during 11 minutes. The mixture was heated for another 77 minutes at 95° to 105° C. At room temperature, the product was a soft solid which was dispersible in water. It had a hydroxyl No. of 357, acid No. of 2.0 and a saponification No. of 17.3.

By comparing the product of the above example, it can be shown that it conforms to the generic formula given. If one substitutes an equivalent molar amount of cetyl isocyanate for the octadecyl isocyanate, the corresponding cetyl derivative will result by carrying out the reaction under the same conditions.

*Example III*

63 gms. of octadecyl isocyanate and 107.5 gms. of a polyoxyethylene derivative of N-methyl glucamine containing an average of 20 oxyethylene groups per mole of methyl glucamine were heated together on the steam bath with agitation for 4 hours. On cooling, the product was a soft wax which was readily dispersible in water, giving foaming aqueous dispersions.

By substituting an equivalent molar amount of octadecenyl isocyanate for the octadecyl isocyanate, the corresponding octadecenyl derivative results by carrying out the reaction under the same conditions. The product of Example No. 3 differs from the products of Examples 1 and 2 in that in Examples 1 and 2, equal molar quantities of isocyanate and glucamine derivatives were reacted. In contrast to this, in Example 3, approximately 2 moles of isocyanate was reacted with 1 mole of glucamine derivative. Thus by reference to the generic formula $(v)$ is 0 to 1, $(f)$ is 0 to 2, $(e)$ is 0 to 2, $(w)$ is 0 to 1, $(q)$ is 1 and $q+v+w=2$.

*Example IV*

31.5 gms. of octadecyl isocyanate and 72.3 gms. of a polyoxyethylene derivative of N-methyl glucamine containing an average of 12 oxyethylene groups per mole of methyl glucamine were heated together on the steam bath for 2½ hours. The product was a soft wax which was dispersible in water giving viscous foaming aqueous dispersions.

Since the reactants in this example were reacted on a mole for mole basis, referring to the generic formula, it will be seen that $(v)$ is 0 to 1, $(e)$ and $(f)$ will be 0 to 1, $v+e+f=1$, $q$ is 1 and $q+v+w=2$.

*Example V*

14.2 gms. of ethyl isocyanate and 88.1 gms. of a polyoxypropylene derivative of N-methyl glucamine containing an average of 12 oxypropylene groups per mole of methyl glucamine were mixed and allowed to stand overnight. There was a slow rise in temperature indicating reaction. After standing overnight the reaction mixture was heated on the steam bath for 2 hours to insure complete reaction. The product was a viscous light amber colored liquid which was slightly soluble in lubricating oil. It is soluble in water giving opalescent solutions.

Since 2 moles of isocyanate were reacted with 1 mole of glucamine derivative, when the product is related to the generic formula, it will be seen that the limitations here will be the same as those of Example III.

*Example VI*

11.9 gms. of phenyl isocyanate and 54.3 gms. of N-methyl, N-polyoxypropylene glucamine containing an average of 6 oxypropylene groups were mixed and after the initial exothermic reaction had subsided it was heated on the steam bath for 2 hours to complete the reaction. The product was a viscous light amber colored liquid which was slightly soluble in lubricating oil. It is insoluble in water, but soluble in dilute aqueous acids.

Since the reactants in this example were reacted on a mole for mole basis, referring to the generic formula, it will be seen that the limitations here will be the same as those of Example IV. By substituting a polyoxyethylene derivative of N-methyl glucamine as a reactant, a corresponding condensate can be prepared with phenyl isocyanate, under the same conditions.

What is claimed is:

1. The condensation product of an organic isocyanate with a polyhydroxy tertiary amine, which amine is the reaction product between a hexityl amine and from 1 to 100 molar proportions of an alkylene oxide.

2. The condensation product of an alkyl isocyanate containing from 1 to 20 carbon atoms with a polyhydroxy tertiary amine, which amine is the reaction product between a hexityl amine and from 1 to 100 molar proportion of an alkylene oxide.

3. The condensation product of an aryl isocyanate with a polyhydroxy tertiary amine, which amine is the reaction product between a hexityl amine and from 1 to 100 molar proportion of an alkylene oxide.

4. The condensation product of from 1 to 3 molar proportion of an organic isocyanate with one molar proportion of a polyhydroxy tertiary amine which is the reaction product between methyl glucamine and from 1 to 30 molar proportions of an alkylene oxide.

5. The condensation product of from 1 to 3 molar proportions of octadecyl isocyanate with one molar proportion of a polyhydroxy tertiary amine which amine is the reaction product between methyl glucamine and from 1 to 30 molar proportions of an alkylene oxide.

References Cited in the file of this patent

UNITED STATES PATENTS 2,663,729    Searle et al. _____ Dec. 22, 1953